C. D. EVERETT.
Felly-Plates.
No. 138,624.  Patented May 6, 1873.
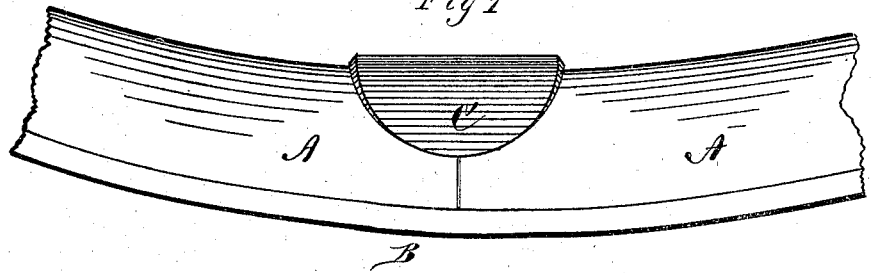
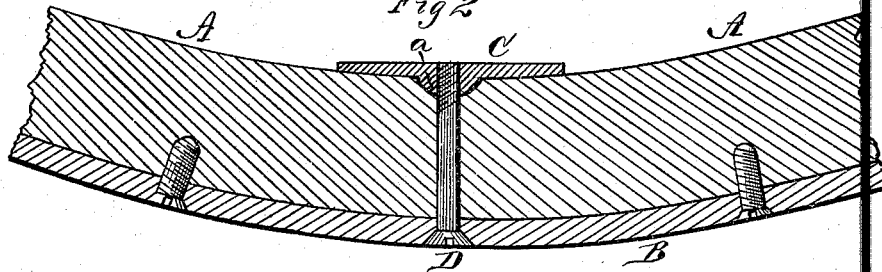
Witnesses
Franck L. Ourand
C. L. Evert
Inventor
Charles D. Everett
per
Alexander Mann
Attorneys

UNITED STATES PATENT OFFICE.

CHARLES D. EVERETT, OF CLEVELAND, OHIO.

IMPROVEMENT IN FELLY-PLATES.

Specification forming part of Letters Patent No. 138,624, dated May 6, 1873; application filed March 21, 1873.

*To all whom it may concern:*

Be it known that I, CHARLES D. EVERETT, of Cleveland, in the county of Cuyahoga and in the State of Ohio, have invented certain new and useful Improvements in Felly-Plate; and do hereby declare that the following is a full, clear, and exact description thereof, reference being had to the accompanying drawing and to the letters of reference marked thereon making a part of this specification.

The present invention is intended as an improvement on the felly-plate for which Letters Patent No. 132,065 were granted to myself and A. Baldwin, October 8, 1872; and it consists in the attachment of the tire and fellies together by an inner plate, placed over the joint of the two adjacent fellies, and held by a single bolt passing directly through the joint, as hereinafter more fully set forth.

In order to enable others skilled in the art to which my invention appertains to make and use the same, I will now proceed to describe its construction and operation, referring to the annexed drawing, in which—

Figure 1 is a side view, and Fig. 2 a longitudinal section, of my invention.

A A represent the ends of two adjoining fellies. B is the tire, C the felly-plate, and D the screw connecting them together. The hole for the bolt or screw D is made half in each felly, the bolt screwing into the plate C. This plate has flanges or sides projecting well and tightly down the sides of the fellies, as shown in Fig. 1.

The advantages this simple and cheap device possesses over others for a similar purpose, are as follows: It consists of but two pieces, viz., one bolt and one plate. The bolt passes through in the joint, one-half being in each end of the fellies, thus acting as a key and preventing lateral movement of the fellies. In a two-bolt plate there is difficulty encountered in getting the holes for the bolts exactly right, and should they be in the least too wide apart or too near together it will not answer, and much trouble is had in getting them right. In this one-bolt plate no such trouble is had.

In the construction of a wheel, in putting it together ready to receive the tire, in order to keep the fellies firmly enough united at the ends, it is the custom to place dowels in the ends, and so uniting them. Where my plate is used this trouble need not be gone to, but the hole for the bolt being bored in the joint, a wooden pin can be driven in, which will keep the joints and fellies firmly in place and enable the putting on of the tire; then the wooden pin can be driven out and the bolt put in.

In repairing a wheel, in setting the tire, it is the custom, in order to allow for shrinkage, to cut off a little of each end of the felly. This brings the holes of a two-bolt plate too near together, which makes a great deal of trouble to get right. With my one-bolt plate no such trouble can arise. In the two-bolt plate the holes in the fellies must be adapted to the plate. In the one-bolt plate the plate is adapted to the hole in the joint, it making no difference where this is as the plate will fit any place.

No particular shape of plate is necessary. It may be round, square, diamond, oval, or any other shape, but in every case it must project down on each side of the fellies to keep the same from splitting.

The felly-plate C is to be thick enough at the point where the hole goes through to receive threads enough to give the strength required. This is accomplished by a swell, $a$, formed on the under part of the plate and embedded into wood, so that the end of the bolt does not project beyond the outside of the plate; hence no dirt, weeds, &c., can lodge or be caught on the end of the bolt.

This plate can be used at any point between the spokes as well as at the joint of fellies, and will also be useful at all points in securing the felly from splitting, or if the felly at any point shows indication of splitting it can be employed to render the same secure, and saving the wheel.

Having thus fully described my invention, what I claim as new, and desire to secure by Letters Patent, is—

In combination with the fellies A A and tire B, the plate C with its embedded swell $a$, provided with female screw-thread and single bolt D, the bolt passing through the joint of the fellies and into the swell $a$ and plate C, substantially as and for the purposes herein set forth.

In testimony that I claim the foregoing I have hereunto set my hand this 26th day of February, 1873.

CHARLES D. EVERETT. [L. S.]

Witnesses:
ARTHUR ODELL,
JESSE H. MCMATH.